May 27, 1947. J. A. PATRICK 2,421,365
DOLLY LIFTING DEVICE
Filed Oct. 26, 1945 4 Sheets-Sheet 1

Inventor:
John A. Patrick
By: Joseph O. Lange Atty.

May 27, 1947. J. A. PATRICK 2,421,365
DOLLY LIFTING DEVICE
Filed Oct. 26, 1945 4 Sheets-Sheet 3

Inventor:
John A. Patrick
By Joseph O. Lange
Atty.

May 27, 1947.  J. A. PATRICK  2,421,365
DOLLY LIFTING DEVICE
Filed Oct. 26, 1945  4 Sheets-Sheet 4
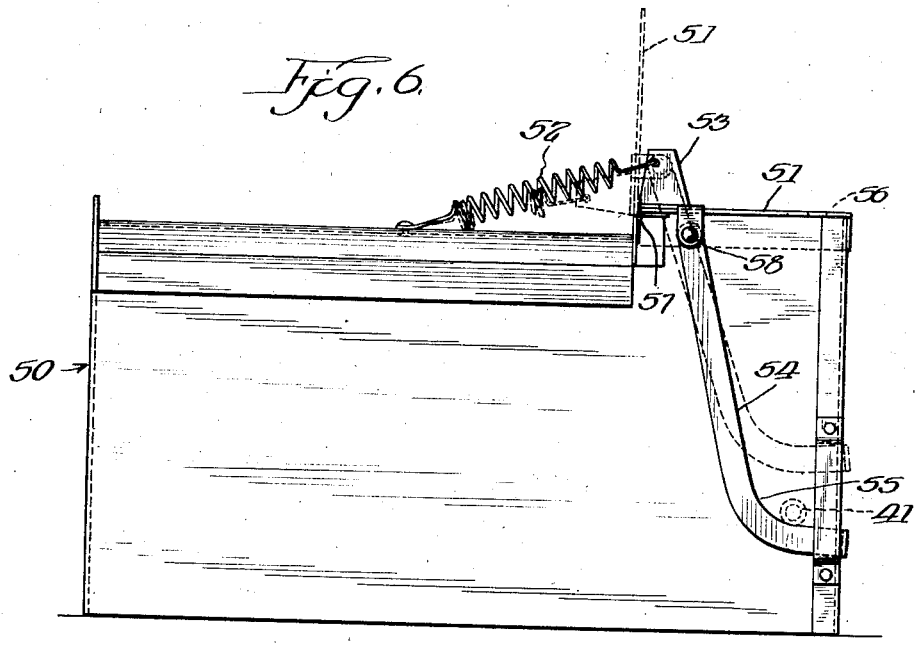
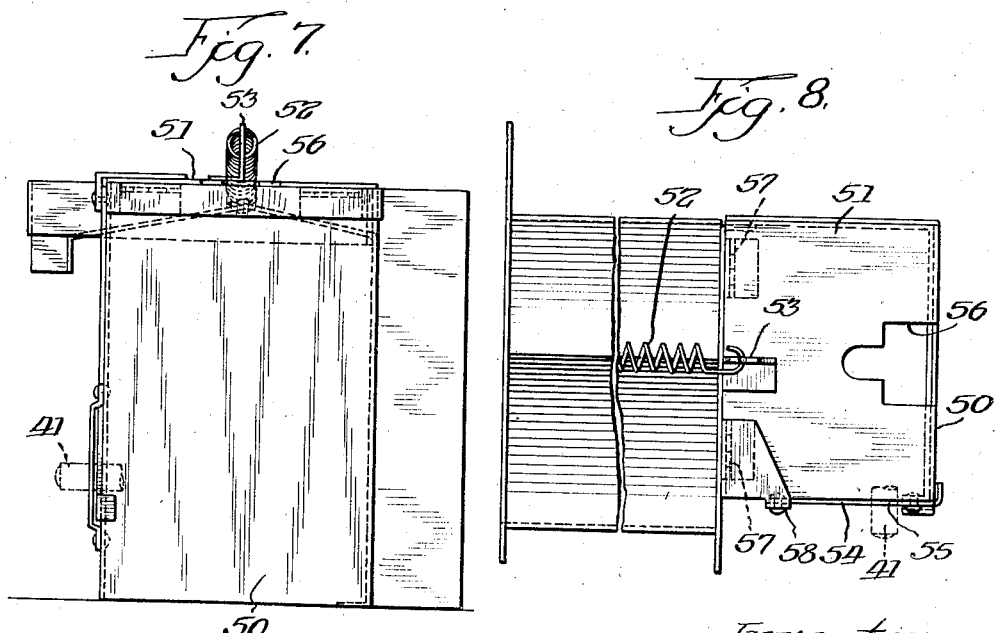
Inventor:
John A. Patrick.
By Joseph O. Lange
Atty.

Patented May 27, 1947

2,421,365

UNITED STATES PATENT OFFICE 2,421,365

DOLLY LIFTING DEVICE

John A. Patrick, Chicago, Ill., assignor to Crane Co., Chicago, Ill., a corporation of Illinois Application October 26, 1945, Serial No. 624,808

12 Claims. (Cl. 214—95)

This invention relates to a conveying means or the like and more particularly it pertains to a novel mold elevating or dolly lifting device in which the mold or mold carrying dolly is conveniently positioned for removal and subsequently placing of the dolly on a turntable for later molding by the molder. It will of course be apparent that the invention is capable of broad application in other than foundry fields where the matter of conveyance presents serious problems.

Heretofore it has been one of the important problems in connection with mold conveyor systems to provide a simple and convenient method of positioning the completed mold to avoid heavy hand labor on the part of the molder and at the same time to accelerate the production of the number of molds produced within a fixed period of time.

Therefore it is one of the more significant objects of this invention to not only place the mold in position but also to conveniently provide for bringing the next mold conveyor or dolly into position and preferably performing both operations at the same time by the simple employment of the upward stroke of an air or hydraulically operated cylinder mounted several feet vertically above the floor level.

Another object is to provide in a dolly lifting device for a pouring conveyor a means whereby the downward stroke of the air cylinder returns the dolly elevating means and the indexing bar along the line of assembled mold conveyors so that each is moved up a predetermined distance, placing the first or leading one ready to be lifted.

As will hereinafter be disclosed in more detail, the downward stroke of the air cylinder returns the dolly elevating hook and the indexing bar, which consists preferably of a flat steel bar upon which are mounted the required number of pivoted lugs in return to pass below the axles of the remaining mold dollies on the assembled lower track.

The invention provides that the required number of weighted and pivoted lugs are tipped down as the indexing bar passes below the axles of the remaining mold dollies on the rack, the lugs returning to an upright position after passing under the axle of each dolly.

This invention is supplementary to the patent application for a Mold dumping device, identified as Serial No. 579,672, filed by Earl S. Walker and Thaddeus J. Glaza on February 24, 1945.

In appreciation of the current contribution it should be understood that heretofore molders have been required to lift the molding dollies by hand. By the current contribution the conveying dollies are brought to a convenient position from the conveying track by fluid operated means. Therefore the present invention actually introduces a novel mechanical operation formerly done by hand.

Another object is to provide in combination therewith suitable means for keeping molding sand out of the actuating mechanism by a novel enclosure, the cover of which is actuated at predetermined stages of operation by the same means employed to move the dolly pusher.

Other objects and advantages will become more readily apparent upon proceeding with the specification read in light of the accompanying drawings in which Fig. 1 is a side view of a device embodying my invention with the mold dolly pusher mechanism in the drawn position.

Fig. 5 is an enlarged fragmentary view of the mold dolly gripper mechanism.

Fig. 6 is a side view of the novel cover arrangement for enclosing the lower portion of the lifting mechanism.

Fig. 7 is an end view of the mechanism referred to in Fig. 6.

Fig. 8 is a plan view of the mechanism referred to in Figs. 6 and 7.

Figure 1:
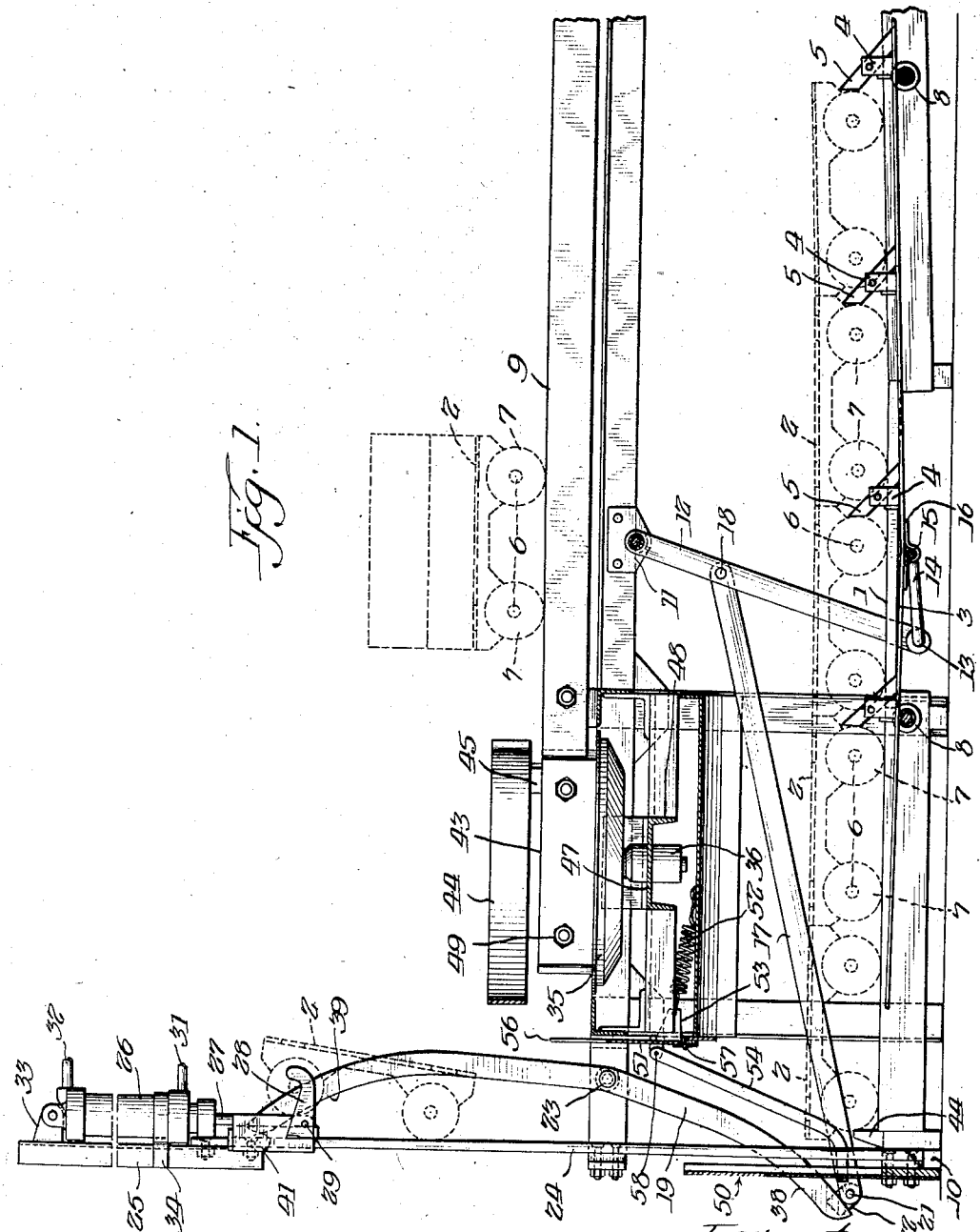
Figure 2:
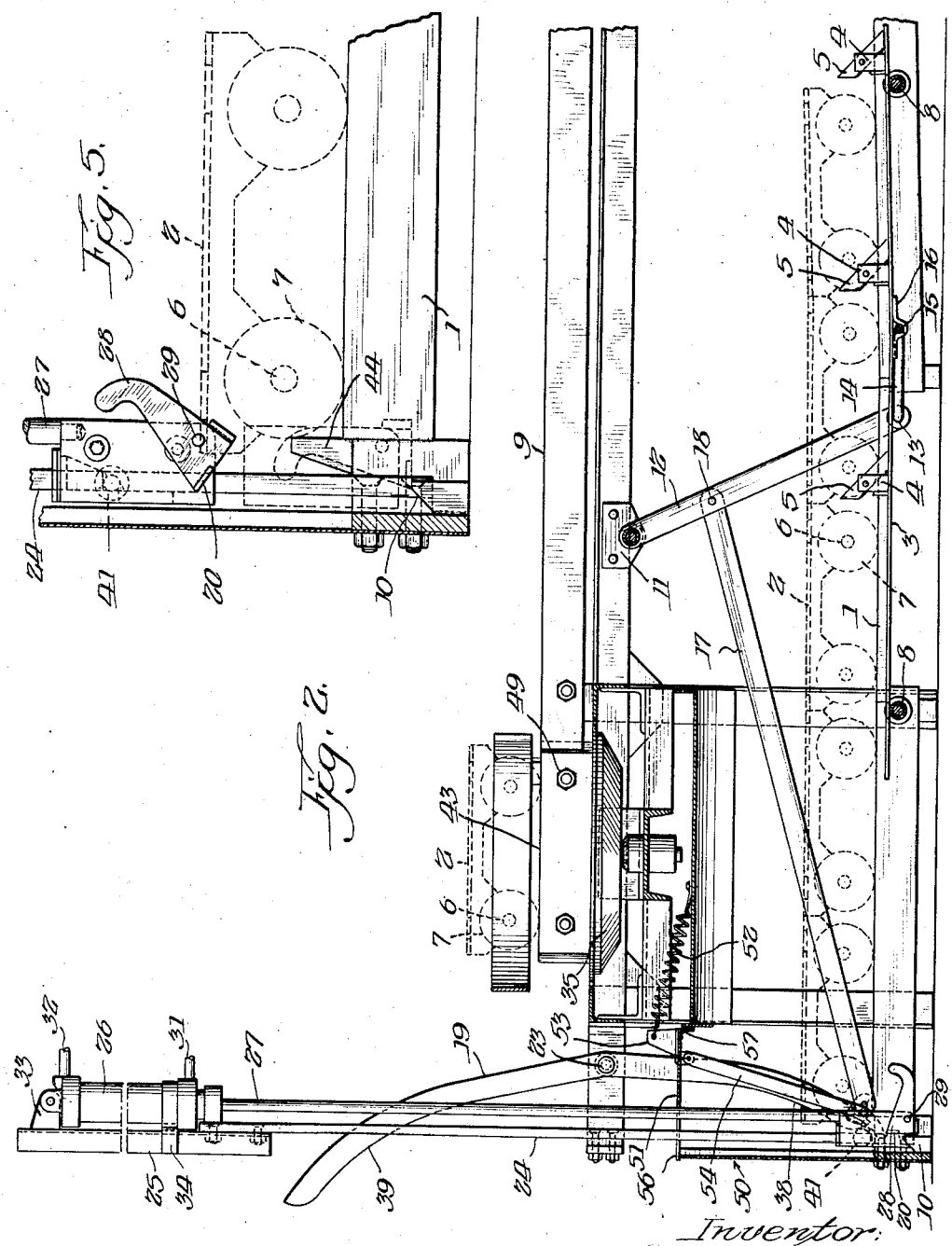
Fig. 2 is a view of the device similar to Fig. 1, but with the pusher mechanism in the released position.
Figure 3:
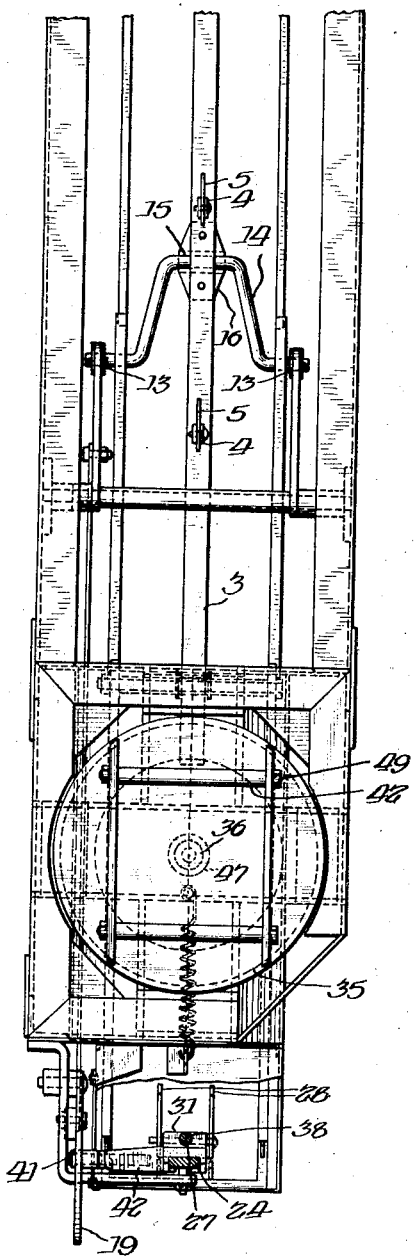
Fig. 3 is a fragmentary plan view of the device in the position shown in Fig. 1.
Figure 4:
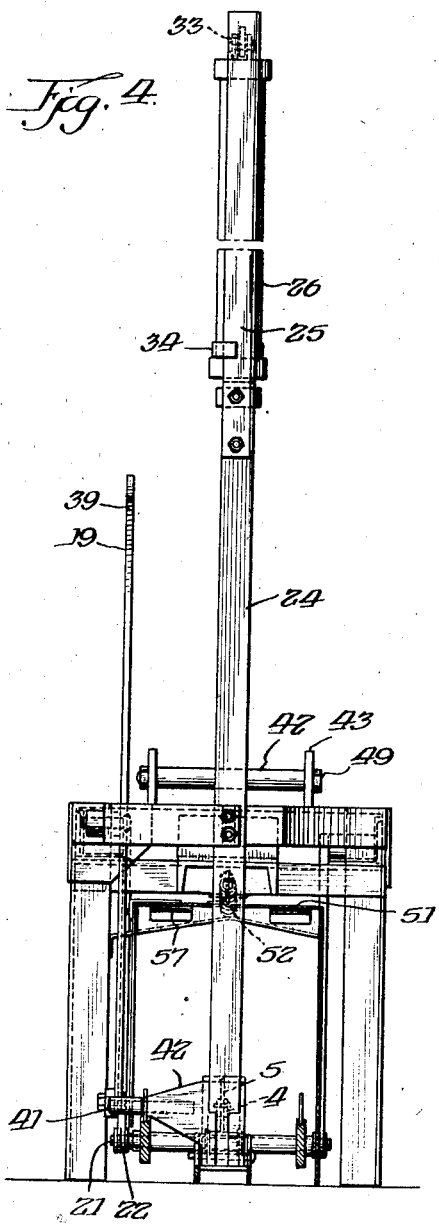
Fig. 4 is an end view of the device embodying my invention.

Referring now to Fig. 1, a conveyor rail 1 is employed upon which the mold dollies 2 (as shown in dotted lines) are mounted, there being four wheels engaging a pair of tracks parallel therewith. The dollies 2 as they are mounted on the track are empty, since they are being returned from a location in which they have been previously dumped, as disclosed in more detail in the above mentioned patent application, thus preferably at one end of the lower rail 1 it is slightly pitched to assist in permitting the dollies to move slowly by gravity down the track. However, in the event that such gravitational movement is not necessarily present or provided the current invention has in mind employing positive means for inducing such motion of the dollies along the track 1 and in addition to provide for their being positively gripped and lifted to the desired position on the upper rail and molding turntable as hereinafter described. Longitudinally movable between the tracks, as indicated more clearly in Fig. 3, the reciprocably movable dolly pusher bar 3 is fitted with the suitably spaced supporting clips 4, having the pivotally mounted tripping lugs 5 which engage the axles 6 of the mold holding dollies upon which the wheels 7 are mounted. The pusher bar 3, as shown more clearly in Fig. 3, is supported horizontally by means of the pipe spool rollers 8, suitably spaced apart as indicated in Figs. 1 and 2. The upper portion of the conveyor track 1 is provided with a rail or track 9 for carrying away the loaded and finished molds after they have been made by the molder on the conveniently disposed turntable hereinafter referred to more specifically.

Suitably connected at a predetermined distance relative to the pivotal lugs 5 of the pusher bar 3, the bracket 11 is held by suitable bolts to the upper track 9 and from which is pivotally suspended the indexing arm 12. The lower end of the indexing arm is apertured as at 13 to journally receive the bent link bar 14. As more clearly shown in Fig. 3, the latter member is journalled at its central portion 15 within the bearing member 16, the latter member being fastened, as indicated, to the pusher bar 3. At a suitable distance down from the central pivotal point on the bracket 11 for the indexing arm 12, the actuating bar 17 is pivotally connected as at 18. At its opposite end portion the actuating bar 17 is pivotally mounted to the indexing lever 19 as indicated at 21 by means of the transversely extending lug 22. The indexing lever 19 is also pivotally mounted as at 18, to the upper track portion 9 by means of a pin or bearing 23 attached to the track portion 9, as indicated.

The operating end limits of the conveyor track 1 are defined by the vertically extending guide bar 24, serving as a substantial support at 25 for the air cylinder 26 from which the piston rod 27 depends for its reciprocating movement in a manner hereinafter explained. At the lower portion of the piston rod 27, a pair of lift hooks 28 is pivotally mounted as at 29. The hooks 28 are so positioned in spaced apart relation on each side of the centerline of the conveyor as to be able to grip at predetermined times the axles 6 of the dollies 2 having the supporting wheels 7. The upper portion of the guide bar 24 is suitably held or supported if necessary by attachment to a sad hopper or the like, not shown. The cylinder 26 is provided with suitable inlets and connections to a source of fluid supply, such as compressed air for example, for the actuation of the piston therewithin (not shown), which are designated 31 and 32 respectively. The cylinder 26 is attached to the support 25 at its end as indicated at 33 and by means of the clamp 34 at the lower portion thereof. Of course it should be understood that the cylinder 26 is necessarily of greater length than shown in order to permit of the travel required to lift the mold dolly to desired position and is shown in broken lines because of space restrictions. Suitably supported at an end portion of the upper track 9 is the mold turntable 35, upon which the mold dolly 2 is placed after being removed from the hook 28. The upper supporting surface of the turntable is parallel with, and preferably in the same plane as the track 9 so as to permit the mold dolly when loaded to be rolled out onto the track without any further manual lifting. The turntable is suitably supported in the conventional manner by the structure immediately below and is rotatable on the shaft 36 journalled at 47 in the frame portion 48, one end of the turntable frame support being open so as to permit the entrance of the mold dollies to the track 9, as indicated in the dotted lines. It should be noted as shown in Fig. 2 that one of the lifting hooks 28, in the course of reaching the limit of its lowermost travel will normally strike the dog 10 for tripping it into receiving position for the axle 9, thereby making it preferable that the edge 20 of the hook 28 preferably be hardened in order to avoid serious damage to it.

In connection with the operation of the device, let it be assumed that the molder is ready to receive a mold carrier or dolly in order to make the next successive mold and it therefore becomes necessary for the mold dolly to be placed in suitable position for convenient use by the molder upon the turntable 35. The latter member is rotatable in order to allow for the shift of the mold dolly from one track to another depending upon that which is most convenient and least congested in handling completed molds suitable for pouring. The turntable 35 is provided at its upper surface portion with the connecting assembly 42 and track section 43 assembled by bolts 49 which preferably matches with the track 9. A guide frame 44 is supported by the angle member 45. The empty dollies on the lower track 1 will then be in a position as indicated by the dotted lines. The molder will then operate a control valve (not shown) at the air inlet 31 on the air cylinder 29 which causes the piston rod 24 to be lifted vertically. The lift hooks 28 which are suitably attached at 38 to the lowermost end of the piston rod 27, immediately upon rising contacts the center portion of the axle 6 of the dolly 2, and the dolly is lifted to the position shown in dotted lines (Fig. 1) to the desired working level for the molder or other artisan. However in reaching this position, it will be noted that the lowermost position of the rod 24 is provided with a roller extension 41, the extension consisting essentially of a roller which contacts the cam surface portion 39 of the indexing handle 19. Thus, while the rod 27 is being moved upward toward the ultimate position shown in Fig. 1 the roller 41 contacts and rolls along the cam surface 39 of the indexing handle 19 to force the latter to pivot at 23 toward the right from the position shown in Fig. 2, and by so doing, draws the actuating arm 17 forward and also causes the indexing arm 12 to which it is pivotally attached to be similarly moved forward. The latter action thereby pulls the pusher bar 3 forward, thus enabling the pivoted lugs 5 to contact the respective axles 6 and to move another group of dollies forward. Thus it will be apparent that as the piston rod 27 and its attached assembly comprising the hooks 28 and the roller extension 41 are moved upward, the next succeeding dolly is accordingly placed in position for being gripped by the lift hooks 28 on the next succeeding movement of the piston rod. It will be apparent that with movement of the indexing lever 19 in a direction opposite to the position shown in Fig. 2 the pusher bar 3 will be moved to the right and the pivoted lugs 5 mounted on the supports 4 will be tipped down as they pass to the right over the axles of the stationary dollies. The lugs 5 are preferably mounted in an unbalanced state so as to place a counterweight action in the lower portion which thus permits their return to the original described position to grip the axle of the dolly when the pusher bar 3 is again moved to the left. It will thus be apparent that at all times a conveying dolly is in the end position abutting the stop 44 ready to be lifted by the hook 25 and raised to suitable height for positioning upon the turntable 35. The specific manner in which this forward movement of the mold dollies is accomplished, may of course be changed from the particular embodiment illustrated.

Referring now to Figs. 6 to 8 inclusive, an important feature in connection with this invention lies in the ability to keep the lower operating mechanism such as the pivoting hooks 28 and roller 41 relatively free from interference by sand accumulations when the molds are being made above on the turntable. The arrangement for accomplishing such desirable objective is obtained by the construction employing the enclosure generally described 50, which substantially covers a large portion of the lower end portion of the dolly pusher mechanism. The cover 51 of enclosure 50 is actuated by means of the upward movement of the piston rod 27 and normally held open under the influence of the spring 52 which is attached to a lug 53 either fixed or integral with the cover 51. Pivotally attached to the inside surface of the cover 51, the curved rod 54 is mounted. Thus when the roller extension 41 bears downward against the curved portion 55 of the lever 54 it moves the cover 51 from the dotted open position of Fig. 6 to the closed position shown in solid lines which is at such time, as shown in Fig. 2, when the mold is about to be made. In the latter position the cover 51 thus completely prevents the entrance of sand into the lower portion of the mechanism. The aperture 56 in the cover 51 is provided to allow for the piston rod 27 and its lower hook assembly to move through and past the cover during its reciprocating movement as hereinabove described. The relative positions of the lever 54 are more clearly shown in Figs. 1 and 2, in which in Fig. 1, the roller 41 is shown in the position as having opened the cover 51, by release of the lever 54 while in Fig. 2, the roller extension 41 is shown as operating on the end of the rod 55 just beyond the end of the rod 54 and upon the cam surface 55, thereby closing the cover against the action of the spring 52. The operations just described of course take place simultaneously with the operation of the lever 19 above referred to.

While there is in this application specifically illustrated and described one form which the invention may assume in practice, it will of course be understood that the showing provided is for the purpose of illustration only and that the invention may be further modified and embodied in various other forms without departing from its spirit or the scope of the appended claims.

I claim:

1. In a conveyor system of the character described, the combination including a plurality of dollies, a dolly lifting device, an upper platform carrying rail sections for receiving the said dollies, a second platform immediately below said upper platform and comprising rail sections for supporting the dollies thereon preliminary to being lifted, means for moving the said dollies toward an end portion of the said second platform, the said latter means including a horizontally movable pusher bar, means on the said pusher bar for engagement with the said dollies, lever means for moving the said pusher bar longitudinally relative to the rail sections of the said lower platform, the said dolly lifting device being simultaneously actuated with said lever means for moving said pusher bar longitudinally and to permit the latter member including hooks to engage an under portion of the said dollies upon predetermined movement of the said pusher bar.

2. A conveyor, a plurality of dollies, a dolly lifting device at one end limit of the conveyor to provide for substantially vertical movement of the latter members, the combination including a track structure for receiving the said dollies, a second track structure immediately below said first track structure for supporting the dollies thereon while being moved toward the end limits of the conveyor, means for moving the said dollies toward an end portion of the said second track structure including a horizontally movable lever having projecting means for engagement with the said dollies, pivotally mounted means for moving the said horizontal lever in opposite directions relative to the second track structure, the said dolly lifting device being fluid actuated and simultaneously movable with the said pivotally mounted means for moving said horizontal lever relative to the said rail sections of the lower platform, whereby upon upward movement of the lifting device the horizontal lever is moved in one direction and upon lowered movement of the lifting device the said horizontal lever is moved in an opposite direction.

3. In a conveyor system, the combination comprising an upper platform, a lower platform, supporting rail sections for at least one platform, a carrier for the rail sections movable between the upper and lower platforms, means for moving the carrier for transfer to the upper platform, the said latter means comprising actuating means including an indexing lever, a reciprocably movable push bar cooperating with the lower platform and actuated by the indexing lever for conveying motion to the said carriers, fluid actuated means cooperating with said latter means and with said indexing lever for lifting the said carriers to the said upper platform, an enclosure for a portion of the said indexing lever and fluid actuated means, a cover for the enclosure, the said cover being movable from open to closed position upon predetermined movement of the means for moving the said carrier for transfer to the upper platform.

4. A mold conveyor system or the like, the combination comprising an upper platform, a lower platform, supporting rail sections for at least one of the platforms, carriers for the rail sections movable between the upper and lower platforms, lifting means for moving the carriers to the plane of the upper platform, actuating means therefor including an indexing lever, a reciprocably movable push bar cooperating with the indexing lever for conveying motion to the carriers along the lower platform, fluid actuated hooks cooperating with said indexing lever for lifting the said carriers to the said upper platform, means movable with the said hooks for bearing against a surface portion of the said indexing lever whereby upon upward movement of the said lifting means the said push bar is predeterminedly moved to actuate the carriers on the lower platform correspondingly.

5. In a mold conveyor system, the combination comprising an upper platform, a lower platform, supporting rail sections for at least one of the platforms, a mold carrier for the rail section movable between the upper and lower platforms, a turntable in the plane of the upper platform, fluid operated means for moving the mold carrier for transfer to said turntable, means cooperating with the fluid operated means comprising respectively an indexing lever, a reciprocably movable push bar, pivotally mounted levers therebetween cooperating with the lower platform and actuated by the indexing lever for conveying motion in one direction to the mold carriers, the said indexing lever being movable substantially simultaneous with the actuation of the said fluid operated means for lifting the mold carriers to the upper plane of the turntable.

6. A conveyor system including an upper platform, a lower platform, supporting rail sections for at least one of the said platforms, carriers for the rail sections movable between the upper and lower platforms, means for moving the carriers along the lower platform for subsequent transfer of the carriers to the upper platform, the said means comprising actuating means including an indexing lever with a curved surface portion, a reciprocably movable push bar pivotally movable relative to the said indexing lever, fluid actuated means cooperating with the said indexing lever for lifting the carriers to the said upper platform, a member movable by the said fluid actuated means having a projecting portion movable along the curved surface portion of the said indexing lever when the carriers are being lifted.

7. In a conveyor system, the combination comprising an upper platform, a lower platform, supporting rail sections for at least one platform, a carrier for the rail sections movable between the upper and lower platforms, means for moving the carrier for transfer to the upper platform, the said latter means comprising actuating means including an indexing lever, a reciprocably movable pusher bar cooperating with the lower platform and actuated by the indexing lever for conveying motion to the said carriers, fluid actuated means cooperating with said latter means and with said indexing lever for lifting the said carrier to the said upper platform, the said reciprocably movable pusher bar being provided with pivot means tiltable in one direction to engage the carrier upon predetermined movement of the pusher bar and tiltable in an opposite direction to pass beneath the carrier upon movement of the pusher bar in another direction.

8. In a conveyor system of the character described, the combination including a plurality of dollies, a dolly lifting device, an upper platform carrying rail sections for receiving the said dollies, a second platform immediately below said upper platform and comprising rail sections for supporting the dollies thereon preliminary to being lifted, means for moving the said dollies toward an end portion of the said second platform, the said latter means including a horizontally movable pusher bar, means on the said pusher bar for engagement with the said dollies, lever means for moving the said pusher bar longitudinally relative to the rail sections of the said lower platform, a vertically extending guide bar cooperating with the said lever means, the said dolly lifting device being simultaneously actuated with the said lever means for moving said pusher bar longitudinally and to permit the latter member including hooks to engage an under portion of the said dollies upon predetermined movement of the said pusher bar, the end limits of the upper and lower platform being defined by the said guide bar, the latter member having means for tripping the said hooks to effect said engagement.

9. A conveyor, a plurality of dollies, a dolly lifting device at one end limit of the conveyor to provide for substantially vertical movement of the latter members, the combination including a track structure for receiving the said dollies, a second track structure immediately below said first track structure for supporting the dollies thereon while being moved toward the end limits of the conveyor, means for moving the said dollies toward an end portion of the said second track structure including a horizontally movable lever having projecting means for engagement with the said dollies, pivotally mounted means for moving the said horizontal lever in opposite directions relative to the second track structure, the said dolly lifting device being fluid actuated and simultaneously movable with the said pivotally mounted means for moving said horizontal lever relative to the said rail sections of the lower platform, the said pivotally mounted means including an indexing handle with a transversely extending cam surface, the said lifting device having means for contact along the cam surface whereby upon upward movement of the lifting device the horizontal lever is moved in one direction and upon lowered movement of the lifting device the said horizontal lever is moved in an opposite direction.

10. A conveyor system including an upper platform, a lower platform, supporting rail sections for at least one of the said platforms, carriers for the rail sections movable between the upper and lower platforms, means for moving the carriers along the lower platform for subsequent transfer of the carriers to the upper platform, the said means comprising actuating means including an indexing lever with a curved surface portion, said indexing lever being pivotably mounted relative to the said upper platform, a reciprocably movable pusher bar supported by the said lower platform and pivotally movable relative to the said indexing lever, fluid actuated means cooperating with the said indexing lever for lifting the carriers to the said upper platform, a member movable by the said fluid actuated means having a projecting portion movable along the curved surface portion of the said indexing lever when the carriers are being lifted.

11. A mold conveyor system or the like, the combination comprising an upper platform, a lower platform, supporting rail sections for at least one of the platforms, carriers for the rail sections movable between the upper and lower platforms, lifting means for moving the carriers to the plane of the upper platform, actuating means therefor including an indexing lever, a reciprocably movable push bar cooperating with the indexing lever for conveying motion to the carriers along the lower platform, a vertically movable piston rod, fluid operating means for actuating said piston rod, fluid actuated hooks connected to said piston rod and cooperating with the said indexing lever for lifting the said carriers to the said upper platform, means movable with the said hooks consisting of a roller extension and roller for bearing against a cam surface portion of the said indexing lever whereby upon upward movement of the said lifting means the said actuating means is drawn forward and the said push bar is moved predeterminedly to actuate the carriers on the lower platform correspondingly.

12. In a mold conveyor system, the combination comprising an upper platform, a lower platform, supporting rail sections for at least one of the platforms, a mold carrier for the rail section movable between the upper and lower platforms, fluid operated means for vertically moving the mold carrier, means cooperating with the fluid operated means comprising respectively an indexing lever, a reciprocably movable pusher bar, pivotally mounted levers therebetween cooperating with the lower platform and actuated by the indexing lever for conveying motion in one direction to the mold carrier, the said indexing lever being movable substantially simultaneous with the actuation of the said fluid operated means for lifting the mold carrier to the upper platform and to move said pusher bar for engagement with the mold carrier.

JOHN A. PATRICK.

REFERENCES CITED

The following references are of record in the file of this patent:

UNITED STATES PATENTS

| Number | Name | Date |
| --- | --- | --- |
| 1,704,342 | Redpath | Mar. 5, 1929 |
| 2,233,070 | Lepley | July 10, 1917 |
| 1,469,329 | Olson | Oct. 2, 1923 |
| 775,627 | Johnston | Nov. 22, 1904 |
| 1,467,409 | Wilkinson | Sept. 11, 1923 |
| 1,428,184 | Price | Sept. 5, 1922 |
| 1,925,442 | Fournier | Sept. 5, 1933 |